United States Patent

Burn

[15] 3,638,084

[45] Jan. 25, 1972

[54] ENERGY STORAGE CAPACITOR

[72] Inventor: Ian Burn, Williamstown, Mass.

[73] Assignee: Sprague Electric Company, North Adams, Mass.

[22] Filed: May 14, 1970

[21] Appl. No.: 37,082

[52] U.S. Cl. .................................. 317/258, 252/63.2
[51] Int. Cl. ................................................ H01g 1/01
[58] Field of Search ........................ 252/63.2; 317/258

[56] References Cited

UNITED STATES PATENTS 2,293,077  12/1966  Kaiser ........................... 317/258 X
3,495,996  2/1970  Delaney .......................... 317/258 X Primary Examiner—E. A. Goldberg
Attorney—Connolly and Hutz, Vincent H. Sweeney, James Paul O'Sullivan and David R. Thornton

[57] ABSTRACT

The capacitor includes at least one pair of electrodes separated by high-energy storage material consisting essentially of 85-95 percent by volume of an antiferroelectric ceramic and 5-15 percent by volume of nonreactive glass fired into a coherent body.

5 Claims, 4 Drawing Figures

ENERGY STORAGE CAPACITOR

BACKGROUND OF THE INVENTION

This invention pertains to energy storage devices and more particularly to energy storage capacitors employing antiferroelectric materials.

In the prior art antiferroelectric materials which exhibit double hysteresis loops and may be forced into a ferroelectric state by the application of an electric field above a certain threshold value, have been suggested for energy storage devices. The threshold value depends upon both the material and temperature, and should be high at conventional operating temperatures in order to obtain worthwhile energy densities. However, antiferroelectric materials having high threshold value and sufficiently high breakdown strength are not available in the prior art.

That is, the breakdown strength of the material must exceed the threshold value in order for the ferroelectric state to be reached. In the prior art, this has only been achieved by compositions of low threshold value or by operation at exceptionally high temperatures which lowers the threshold value below the breakdown point. Consequently, these result in low energy storage and objectionable temperature requirements.

SUMMARY OF THE INVENTION

It is the object of this invention to provide a high energy storage capacitor suitable for conventional temperature operation.

It is another object of this invention to provide an antiferroelectric energy storage material having high energy storage capacity and high breakdown strength.

It is a further object of this invention to provide an energy storage material of high breakdown strength which is a mixture of antiferroelectric material and glass.

Broadly, an energy storage capacitor provided in accordance with the invention comprises at least one pair of electrodes separated by high energy material consisting essentially of 85–95 percent by volume of antiferroelectric ceramic material selected from the group consisting of lead zirconate, lead hafnate and mixtures thereof and a 15–5 percent by volume of glass which wets the ceramic material but produces minimum dissolution of it.

DESCRIPTION OF THE PREFERRED EMBODIMENTS

In the preferred embodiments, high energy storage material which is a mixture of antiferroelectric ceramic material and glass is interposed between two conductive electrodes. Preferably, the material is a mixture of substantially lead zirconate ($PbZrO_3$) or lead hafnate ($PbHfO_3$) in a glassy material, employed as a thin layer between metal electrodes of gold, silver, or silver-platinum alloys, or the like.

The high energy storage material is formed by suspending particles of an antiferroelectric material in a glassy binder material which will wet the ceramic particles with minimum dissolution thereof and bond them in a coherent body having high breakdown strength. Additionally, the temperature coefficient of expansion of both ceramic and glass should be approximately matched. A glass such as taught in U.S. Pat. application Ser. No. 767,046, filed Sept. 26, 1968 by Galeb H. Maher will be suitable.

The method of forming the novel composition involves combining the high temperature antiferroelectric ceramic powder with a low temperature glass, and firing the combination at a temperature above the softening point of the low temperature binder material. The low softening point glass consists essentially of:

| | | | |
|---|---|---|---|
| CdO | 20–40% | $Al_2O_3$ | 0–2% |
| $Bi_2O_3$ | 18–32% | $B_2O_3$ | 0–8% |
| PbO | 16–35% | $SiO_2$ | 0–8% |
| ZnO | 0–7.5% | CaO | 0–5% | and preferably essentially consists of:

| | | | |
|---|---|---|---|
| CdO | 36% | $Al_2O_3$ | 1% |
| $Bi_2O_3$ | 23% | $B_2O_3$ | 5% |
| PbO | 25% | $SiO_2$ | 5% |
| ZnO | 5% | | |

Advantageously, the indicated glass does not excessively react with the antiferroelectric material so as to produce new crystalline phases in the composite body. Other types similar to the preferred ceramic may be useful; however, glasses such as $PbO\text{-}SiO_2\text{-}B_2O_3$ or $BaO\text{-}Al_2O_3\text{-}B_2O_3$ which produce excessive chemical interaction with the antiferroelectric material are unsuitable since they result in compositions having poor dielectric strength and low energy storage.

Figure 1:
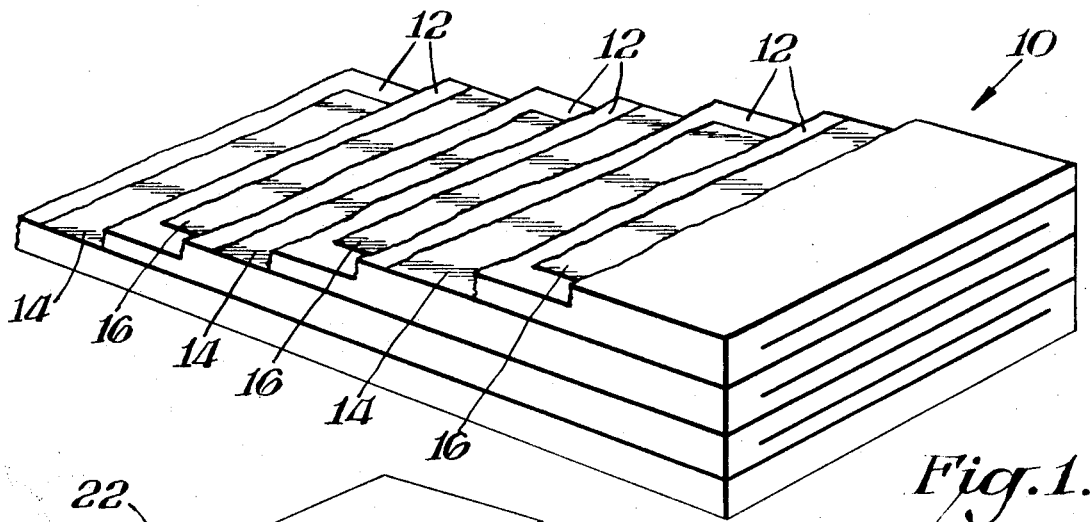
FIG. 1 is a perspective view partly broken of a buildup of alternate layers of energy storage material and staggered electrodes.
Figure 2:
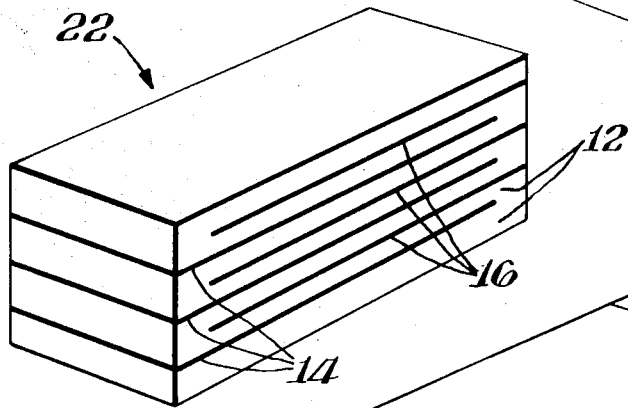
FIG. 2 is a perspective view of the energy storage capacitor chip cut from the structure of FIG. 1.

Referring to the drawing, FIG. 2 shows a buildup 10 of alternate layers of antiferroelectric material 12 and staggered conductive electrodes 14 and 16 which may be of silver, gold, platinum or silver-platinum alloys or the like. The buildup 10 is cut or diced to form individual capacitor sections or chips 22 as shown in FIG. 2.

Figure 3:
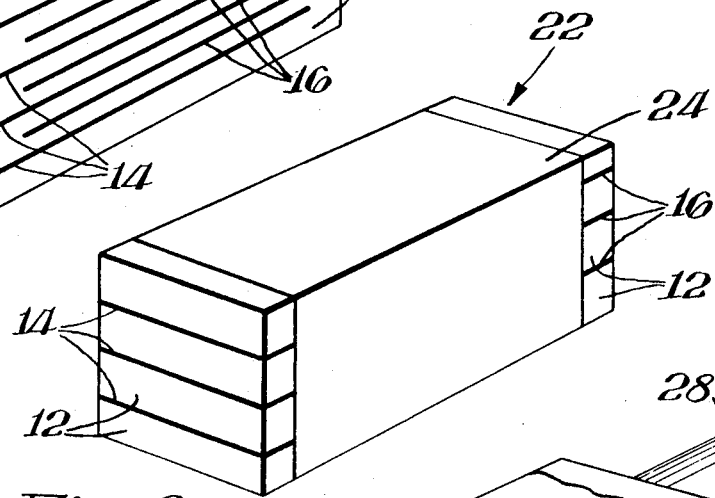
FIG. 3 is a perspective view of the chip of FIG. 2 with a dielectric coating over the cooperating electrodes.
Figure 4:
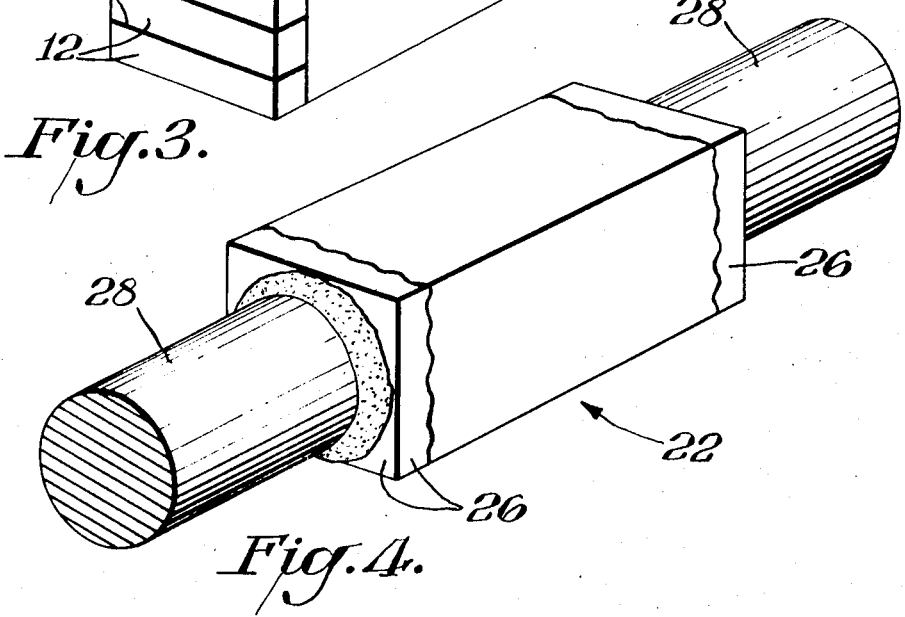
FIG. 4 is a perspective view of the completed capacitor with leads attached.

The individual chips 22 are coated with a dielectric material 24, for example ceramic or the like, on the central portion thereof to cover the edges of the cooperating electrodes exposed by the dicing, as shown in FIG. 3. The units are then fired to give optimum densification, for example, at approximately 1,825° F. for 5 minutes. Thereafter the electrode ends are exposed at the end faces of section 22 by grinding or polishing. A conductive fusible material 26 (such as a silver paste or the like) is then applied to afford contact between similar electrodes, and terminal leads 28 are attached to contacts 26 by soft solder or the like.

In a specific example, a high energy storage capacitor was formed in the following manner:

150 grams of lead zirconate sold by Tamco under the trade name "Ticon PZ" was mixed and milled with 13.1 grams of the preferred low softening point glass and 75 grams of ethyl cellulose binder in a porcelain mill until a particle size of less than 5 microns was obtained.

A first electrode of a 60% Ag-40% Pd mixture approximately 0.2 mils thick was then screened on the upper surface of the formed layers with the electrode extended to one longitudinal edge of the unit. An approximately 1.5–2.0 mil thick layer of the dielectric mixture was screened over the first electrode to form a first dielectric layer, and then a second 2-mil thick Ag-Pd electrode as above was screened on the upper surface and extended to the opposite longitudinal edge of the unit.

Successive dielectric layers and alternating first and second electrodes were then screened until several electrode pairs were completed. Then several layers of the dielectric mixture were screened on the final second electrode to form an approximately 10 mil thick top surface.

The unit was then diced into individual capacitor sections approximately five-sixteenths inch by five-sixteenths inch, by transverse cuts which left alternate electrodes extended to the end faces. The sections were removed from the glass substrate and coated, except for their end faces, to a thickness of 2.0 mils with the dielectric mixture. Next, the sections were fired at 1,825° F. for approximately 5 minutes to give optimum densification. The end faces of each section were then polished to expose and clean the electrode edges, and a silver paste deposited on the end faces.

The units were fired at 1,400° F. Finally, conductive leads were soldered to the end faces to complete the units.

Units prepared in the foregoing manner withstood fields up to 1,000 volts per mil (1,500–2,000 volts) and double hysteresis loops of field enforced ferroelectricity were observed by means of a Sawyer-tower circuit and an oscilloscope for AC fields over 750 volts per mil (0-peak.)

The energy storage of the sections when charged by DC fields up to 1,000 volts per mil (1,500–2,000 volts DC) produced up to 35 joules per cubic inch.

Advantageously, the purity of the antiferroelectric material is not particularly critical; some additives or impurities will increase the energy storage density while others diminish it. Where additives are used in the antiferroelectric ceramic, the lead zirconate, lead hafnate or mixtures thereof should make up at least 50 percent by volume and preferably over 90 percent by volume of the ceramic. As indicated previously, the antiferroelectric ceramic should be 85 to 95 percent by volume of the coherent ceramic glass body.

What is claimed is:

1. An energy storage capacitor comprising a high energy storage material separating at least a pair of conductive electrodes; said material consisting essentially of 85–95 percent by volume of an antiferroelectric material selected from the group consisting of lead zirconate, lead hafnate and mixtures thereof, and 15–5 percent by volume of glass capable of wetting said antiferroelectric material with minimum dissolution thereof, said glass consisting essentially of

| | | | |
|---|---|---|---|
| CdO | 20–40% | $Al_2O_3$ | 0–2% |
| $Bi_2O_3$ | 18–32% | $B_2O_3$ | 0–8% |
| PbO | 16–35% | $SiO_2$ | 0–8% |
| ZnO | 0–7.5% | CaO | 0–5% |

2. The capacitor of claim 1 wherein said high temperature ceramic material is lead zirconate.

3. The capacitor of claim 1 wherein said high temperature material is lead hafnate.

4. The capacitor of claim 1 wherein said glass consists essentially of:

| | | | |
|---|---|---|---|
| CdO | 36% | $Al_2O_3$ | 1% |
| $Bi_2O_3$ | 23% | $B_2O_3$ | 5% |
| PbO | 25% | $SiO_2$ | 5% |
| ZnO | 5% | | |

5. The capacitor of claim 1 wherein said electrodes are selected from the group consisting of silver, gold, platinum and silver-platinum alloys.

* * * * *